United States Patent

[11] 3,598,493

[72] Inventor Gene A. Fisher
　　　　　　　Boulder, Colo.
[21] Appl. No. 837,826
[22] Filed June 30, 1969
[45] Patented Aug. 10, 1971
[73] Assignee International Business Machines Corporation
　　　　　　　Armonk, N.Y.

[54] OPTICAL GRADUATED RULE OF TRANSPARENT MATERIAL
15 Claims, 12 Drawing Figs.
[52] U.S. Cl. .................................................. 356/152,
　　　　350/112, 350/285, 250/231
[51] Int. Cl. ..................................................... G02b 17/00
[50] Field of Search ........................................... 350/99,
　　　103, 273, 285, 109, 12, 266; 356/152; 73/488;
　　　324/175; 33/129; 250/233, 231 SE

[56] References Cited
UNITED STATES PATENTS
2,818,500  12/1953  Franck ......................... 350/103
3,524,067  8/1970  West ............................ 250/231 R
FOREIGN PATENTS
991,873  5/1965  Great Britain ................. 350/112

Primary Examiner—Rodney D. Bennett, Jr.
Assistant Examiner—S. C. Buczinski
Attorneys—Hanifin and Jancin and Herbert F. Somermeyer ABSTRACT: Transparent material having internal reflection properties is used to fabricate a graduated optical rule usable in tachometer or displacement measuring systems. The member has a light-receiving surface through which light is transmitted toward a remote surface in a given direction. Such remote surface has alternating first surface portions respectively having a 45° angle with respect to said given direction and, preferably, second surface portions that are perpendicular to said given direction. The 45° surface portions reflect the light to a first light path, while the second surface portions permit the light to be transmitted therethrough along a second light path. Facing ones of said first or 45° angled portions are utilized to reflect the light through such first light path which intersects the light receiving surface back toward the light source. In another embodiment, light enters the member at 45° through a light receiving surface. A continuous internal surface disposed at 45° with respect to the light-receiving surface reflects light toward the remote surface in such given direction. The remote surface has the first and second surface portions disposed with respect to light traveling in such given direction reflected from the internal surface for alternately reflecting and transmitting through the remote surface toward a detector. Several utilization arrangements are illustrated.

PATENTED AUG 10 1971

INVENTOR
GENE A. FISHER

BY Herbert F. Somermeyer

ATTORNEY

PATENTED AUG 10 1971

OPTICAL GRADUATED RULE OF TRANSPARENT MATERIAL

BACKGROUND OF THE INVENTION

The present invention relates to measurement devices utilizing optical techniques and, more particularly, to a graduated rule constructed of wholly transparent material and systems employing such a graduated rule.

Optical measuring systems are finding wider and wider applications as displacement measurement devices, tachometers, and related devices. Many such optical systems selectively actuate photodetectors which generate pulsating electrical currents in response to such selective actuation. Selective actuation of photodetectors can provide alternate times of light and no-light to which the photodetector is photoresponsive. Such optical systems can be generally categorized as refractive, reflective, or "see-through." The reflective and "see-through" optical systems are most easily operated with digital control systems in that the optical system is easy to make digital in character. Such digitalization of an optical system is usually accomplished by using reflective and nonreflective portions in a reflective system; opaque and transparent portions in a "see-through" type of system. Refraction systems can be used to create a phase shift in an electrical signal generated in response to refracted light waves when compared with a standard. Also, such refraction systems have been used to disperse light such that the light intensity supplied to a light detector is "switched" between two light intensities.

Of prime importance in a digitalized optical system is the so-called light to dark ratio. Such ratio occurs in all three categories of optical systems. The greater the ratio, the more reliable the optical system will tend to be. Also, in many operating environments, the optical system may be subjected to an accumulation of particulate matter which interferes with the reflectivity, light transmissiveness, or refraction of light by the optical system. Such particulate matter has a tendency to reduce the above-mentioned light to dark ratio. Therefore, in many optical systems, if the light to dark ratio initially is marginal; then, when that system is operated in an environment of particulate matter, the performance could become unsatisfactory. Therefore, it is desired in a digitalized optical system to have as high as possible light-to-dark ratio.

Some digitalized optical systems of the reflective or "see-through" have been fabricated using photolithographic techniques to form alternate reflective and nonreflective surfaces or opaque and transparent surfaces. Photolithographic techniques are relatively expensive resulting in a relatively expensive graduated rule. Photolithographic techniques, however, are satisfactory for creating a large number of alternate surface portions of light and dark areas to a high degree of accuracy. It has been found that, even with so-called opaque coating or surface on an optical rule, the light-to-dark ratio is not high. That is, in precise graduated rules, for example, of 100 of more alternate areas per inch, the so-called opaque area is not truly opaque (i.e., allows some light to be transmitted). In the reflective systems, even in the nonreflective areas, some light is reflected. A light-to-dark ratio of 10:1 is not unusual in a new graduated rule for use in a displacement measuring device. Such a light-to-dark ratio requires sensitive electrical circuits which add to the cost of making a complete displacement measuring device and tends to reduce the fidelity and the reliability of the measurements being made.

Many digitalized optical measurement systems use graduated rules in the form of a disc or annulus mounted on a rotating member such as a motor shaft, pulley, and the like. Some of these systems are designed to be high-acceleration devices requiring a low inertia rotor. Since each tachometer disc or displacement measuring annulus has a finite weight, it adds to the inertia of the system and thereby has a tendency to degrade acceleration. In such high-acceleration systems, it is desirable that the weight of the tachometer disc be minimized for minimizing the addition to the inertia of the rotor. Even in such high acceleration systems, cost is an overriding factor. The measurement disc, such as a tachometer disc, should be very precise, extremely lightweight, and, preferably, low cost and easily attachable to the rotating member. Further, because of production requirements in many areas, tachometer discs should be easily reproducible at a high rate with a minimum number of fabrication steps to complete the optical graduated rule.

Many digitalized optical systems use a stationary mask having a small aperture for limiting the area on the tachometer disc that affects the photodetector. Such masks are usually required because the light source and detector have a broader light beam that the graduations on the optical rule. To reduce the alignment problems inherent with the use of a mask with a rotating disc or other movable optical graduated scale or rule, it is desired that the disc be designed to minimize the necessity for a mask.

It is also desired to have an optical measuring rule of simple design, high resolution (high light/dark ratios) and easily and inexpensively reproducible.

SUMMARY OF THE INVENTION

It is an object of this invention to provide a digital optical graduated rule of wholly transparent material and being fabricatable using molding techniques.

It is a corollary object to the above object to provide an optical rule of simple construction having very high light-to-dark ratios.

It is another object to provide an optical graduated rule of extreme low cost.

The invention uses transparent material having internal reflection properties such as thermoplastic resins. Exemplary thermoplastic resins include polycarbonates and acrylics. Internal reflection properties are those properties of transparent material to reflect light being transmitted within the material when such light impinges upon an internal surface disposed at 45° with respect to the direction of light travel. The internal surface is backed by a relatively smooth external surface. The smoother the surface, the better the reflectivity. A coating (such as aluminum) on such external surface may (and usually does) reduce the reflectivity of the internal surface.

A graduated rule using the above material in accordance with the invention receives light through a light-receiving surface and transmits such light within the material in a given direction toward a remote surface. The remote surface has a first set of surface portions disposed substantially at 45° with respect to the given direction for reflecting, in accordance with the internal reflection properties, substantially all light arriving along said given direction to a first set of light paths, respectively. The first light paths extend away from the first surface portions inside the member at 90° with respect to the given direction and such that the first light paths do not intersect the remote surface portions. Preferably, the first light path returns through the light-receiving surface such as to provide reflection of the light impinging upon the light-receiving surface. A second set of surface portions are interposed between adjacent ones of the first set of surface portions and disposed at other than 45° with respect to the given direction for permitting light arriving along said given direction to leave the member of transparent material through the remote surface. The member is thereby provided with alternate portions of light transmissive areas and light reflective areas. Such alternate portions are utilizable as digital indicia of displacement of the member. Light detectors can be placed in either the first or second light paths for detecting displacement.

In one arrangement of the 45° or first set of surface portions, there are pairs of such portions facing each other inside the member such that he light arriving in a given direction at a first one of the first surfaces in the pair is reflected at 90° to said given direction to a second one of said first surfaces in the pair. The reflected light in said first path arrives at the second one of said first set of surface portions to be reflected toward the light-receiving surface in an antiparallel relationship to and displaced from the received light. Therefore, the light is reflected by the member of transparent material at a point displaced from the point of receipt enabling a light source to shine light at the member and a detector placed in side-by-side relationship to receive such light. Such facing 45° surfaces may be separated by another surface that is parallel to the light-receiving surface, or the two facing 45° surfaces may join to form a continuous opaque or light reflective area. Many possible arrangements can be configured sing the teachings of the present invention, such as the disposition of a continuous 45° disposed surface for reflecting the light from the light-receiving surface toward the remote surface. The remote surface has the alternating first and second surface portions for respectively reflecting and transmitting light. The reflected light from the remote surface is reflected to the 45° continuous surface and thence through the light receiving surface. Other configurations are possible including a plurality of remote surfaces disposed such as to provide a plural phase light transmission or light reflection. A single light transmissive and a pair of light reflective surfaces may be utilized to provide an optical fiducial mark.

The present invention is utilizable not only in rotational displacement systems but in rectilinear motion systems for providing accurate and easily fabricated graduated optical scale systems for displacement measurement.

The foregoing and other objects, features and advantages of the invention will be apparent from the following more particular description of preferred embodiments of the invention, as illustrated in the accompanying drawings.

BRIEF DESCRIPTION OF THE DRAWINGS

For more clearly illustrating the invention in all of the Figures, the illustrated 45° undulations are greatly exaggerated from that expected in most practical implementations of the invention.

DETAILED DESCRIPTION OF THE PREFERRED AND ILLUSTRATIVE EMBODIMENTS

Figure 1:
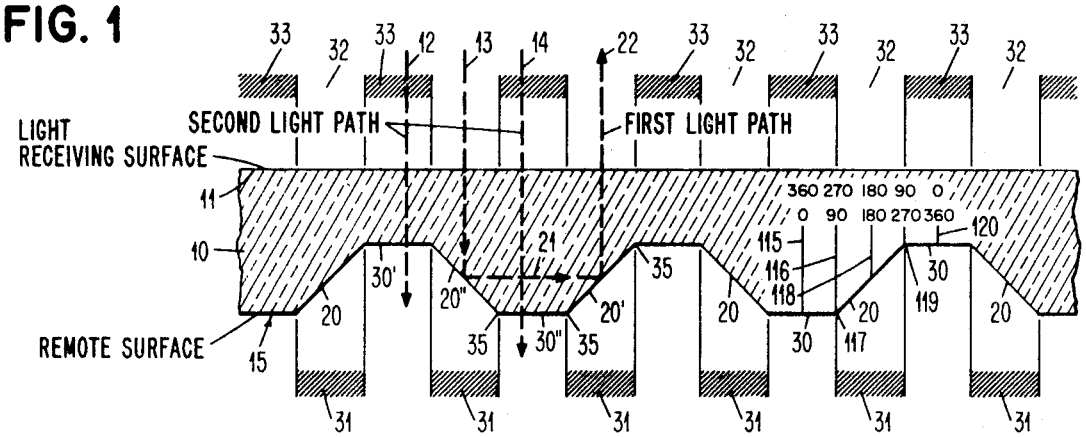
FIG. 1 is an enlarged diagrammatic partial sectional view of an optical graduated rule used to illustrate the principles and teachings of the present invention.

The operating principles of the present invention are explained with particular reference to the preferred embodiment illustrated in FIG. 1. Member 10 consists wholly of transparent material having internal reflection properties. Examples are glasses and thermoplastic resins, such as polycarbonates and acrylics. Light-receiving surface 11 receives light, such as indicated by dotted lines 12, 13, and 14. Such light enters member 10 and is transmitted toward remote surface 15 in a given direction again indicated by the respective dotted lines 12, 13, and 14. Remote surface 15 includes a set of first surface portions 20 disposed at 45° with respect to such given direction. When light represented by line 13 reaches a first surface portion 20, it is reflected by the internal reflection properties of member 10 along a first light path having a first portion 21 extending at right angles to the given direction. The first path portion 21 of the first light path also happens to extend parallel to light receiving surface 11. The first path portion 21 enables light to reach first surface portion 20' and then be reflected in the direction indicated by dotted line 22. The so-reflected light continues along the first light path through member 10 thence through light-receiving surface back toward a light source (not shown). First light path 22, instead of intersecting light-receiving surface 11, could be arranged to intersect another surface of member 10, such as an end or remote surface 15 at another area. See FIG. 12 as an example. The reflected light along line 22 is displaced from the incident light represented by line 13 such that the first light path has a "U-shape" to it. As will become apparent, this arrangement permits a light source and a light detector disposed along the first light path to be placed on the same side of member 10 for operating as an optical measurement device.

The first set of surface portions 20 are relatively smooth with no aluminization or other coating materials thereon. It has been found that the reflectivity of light reaching the set of first surface portions, as indicated by line 13, when smooth is almost 100 percent reflected. This provides a good light-to-dark ratio when the transmissive portions now to be described efficiently transmit light.

Remote surface 15 also includes a set of second surface portions 30 disposed at right angles to the given direction, as indicated by surface portions 30' and 30'' with respect to lines 12 and 14, respectively. It is to be understood that the angle of disposition of the second set of surface portions 30 is not critical; that is, it need not be at right angles to the given direction, but it can be at any angle substantially not 45°. If the second set of surface portions are disposed other than at right angles, the refraction properties of material constituting member 10 must be considered in the transmission of light through remote surface 15.

Light reaching the set of second surface portions 30 from within member 10, such as indicated by lines 12 and 14, is easily transmitted through those second set of surface portions, respectively, in second light paths. With the just-described arrangement using a polycarbonate, a light-to-dark ratio of about 100:1 was obtained when the first and second sets of surface portions were relatively clean and smooth.

Member 10 provides alternate areas of light transmission and light reflection such that on the remote surface 15 side of the member there are alternate areas of darkness and light as the member 10 is moved with respect to a fixed source or if a source is moved with respect to a fixed member. The dark areas, which correspond to an opaque area on a graduated rule, are indicated by the hatched lines 31 and are coincident with the first set of surface portions 20. Interposed between adjacent ones of the dark areas are light areas in which light is transmitted through the respective ones of the second set of surface portions 30 along the second light paths.

Light and dark areas also occur on the light receiving surface 11 side of member 10. Those areas aligned with the first set of surface portions 20 receive reflected light, such as along line 22, to provide a plurality of light areas 32 in the first light paths, respectively. The second set of surface portions 30, by permitting light to be transmitted along the second paths through remote surface 15, provide dark areas 33 along light receiving surface 11, as represented by the hatching. Therefore, light provided from member 10 along first light paths provides light areas on the light-receiving surface side, while light transmitted from member 10 along the second light paths provides alternate light areas on the remote surface side of member 10. In accordance therewith, the unitary optical graduated scale member 10, consisting wholly of transparent material, can be used as a reflective rule, a see-through rule, or a combination of both.

With respect to light arriving through light receiving surface 11 along line 22, it should be observed such light arrives at first surface portion 20 from light receiving surface 11 and is reflected along light path portion 21 toward first surface portion 20''. The light is then reflected along line 13 toward light receiving surface 11. This relationship gives rise to an interesting phenomena in detecting reflected light emitted from member 10 through light-receiving surface 11. Assume that a light source is emitting light along line 13. Also assume that member 10 is moving to the left, as viewed in FIG. 1. First surface 20'' will first reflect light from the source (not shown) received along line 13. The first occurring first light path is along line 22; that is, in the direction from which member 10 is moving toward the light source. As member 10 continues to move, surface portion 20' then receives light from the just-described source; light is then reflected downstream or in a direction of movement of member 10 and will be returned through light-receiving surface 11 in a direction from such light source toward which member 10 is moving. If each and every light area 32 is to be detected, then either a pair of light detectors (not shown) disposed with respect to a light source therebetween, as will become apparent, are used; or, in the alternative, further reflective surfaces may be provided such that one light detector may be used. If only a single light detector is used with no additional optics, then light areas 32, occurring at such single light detector, are equal to one-half the number of first surface portions 20.

Figure 2:
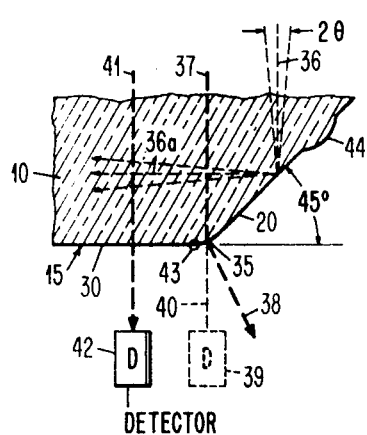
FIG. 2 is an enlarged portion of FIG. 1 showing the effect of a slightly curved surface joining a first surface portion disposed at 45° to a given direction and a light transmissive or second surface portion disposed at 90° with respect to a given direction along which light is transmitted.

An important factor in graduated rules used in optical measurement systems is the abruptness between adjacent light and dark areas. For accurate detection and precise timing, as may be required in tachometers used with high-performance electric motors, there should be a sharp demarcation between adjacent light and dark areas. This requirement is in addition to a good light-to-dark ratio between light and dark areas. In the fabrication of an optical graduated rule, such as shown in FIG. 1, from a thermoplastic resin, the preferred and least expensive way of fabrication is by molding the member. It is well known that in molding plastics, it is difficult to obtain sharp corners, such as corners 35 in member 10. The operation of the embodiments incorporating the present invention is not degraded in performance by a slight rounding of corners 35. Such action is explained with respect to FIG. 2, which is an abbreviated enlarged sectional view at one corner 35 in member 10. A first surface portion 20 is disposed with respect to second surface portion 30 at 45°. Incident light being transmitted through member 10, in one instance, is represented by dotted line 36 and is reflected by first surface portion 20 in the direction of the arrow 36a. Actually, there is a small tolerance (i.e., the angle of the given direction with respect to first surface portion 20 may vary from exactly 45°). This tolerance is shown in FIG. 2 by the angle 20 which may be on the order of 4°; accordingly, surface 20 reflects light arriving at its surface at an angle from 43° through 47°. Materials other than thermoplastic resins may have a different tolerance; also, different polycarbonates may have different tolerances.

Assume for purposes of discussion, there is relative motion between member 10 and the beam of incident light such that the light beam moves successively from line 36 to line 37 and thence to line 41. When such light is arriving along dotted line 37 in the given direction and impinges remote surface 15 at the curvature of corner 35, instead of being reflected, the light is refracted to follow path 38. If a light detector is in a position indicated by number 39 and is focused to receive light along line 40, detector 39 sees none, or very little, of the refracted light. As relative motion between such light beam (line 37) and member 10 continues, the refracted light beam 38 swings around in accordance with the curvature of corner 35. Such action, insofar as light detection by a light detector is concerned, makes the corner appear to be more abrupt than it actually is. Since such curvatures at corners 35 can be made with small radii, it has been found that such curvatures inherent in molding operations have not been detrimental to the resolution and the accuracy of optical graduated rules constructed in accordance with the teachings of the present invention. After the relative movement of member 10 and the light ray have moved past corner 11, as indicated by dotted line 41, detector 42 (formerly represented by dotted box 39) then receives light transmitted through member 10. The actual point on remote surface 15 at which time detector 42 first receives light from member 10 is approximately at point 43.

Good utilization of internal reflective properties requires a substantially smooth surface on first surface portions 20. It is known that an optically smooth surface is considered any surface that has undulations therein not greater than the wavelength of the light or other optical energy with which such a surface is to be used. Such a smooth surface is obtainable by so-called pitch polish techniques. Such techniques are well known and widely used. An optical member having smooth surfaces, in accordance with the teachings of the present invention, is preferably formed by injection molding a plastic member in a mold having relatively smooth surfaces. Actually, the surfaces of the mold die parts need not be optically smooth when known injection molding techniques are used. The reason for this is that the material being injection molded sets or solidifies prior to filling very small tool marking or other groove in a die part. As a result, the surface on the part being injection molded has a smoother surface than such die parts. This phenomenon is easily demonstrated by using the same die part to cast mold a thermoplastic member and then use the same mold for injection molding. Examination under a microscope will illustrate the difference in smoothness of the two molded parts.

An injection-molded, optical graduated rule fabricated in accordance with the teachings of the present invention may include microscopic lines or other deformations on the first set of surface portions 20 as well as the other surfaces. If such deformations or undulations become substantial (i.e., approach a wavelength of the light being used), there may be a refraction of the light with a corresponding reduction in reflectivity of such first surface portions. In one fabricated embodiment, such lines were easily visible using microscopic techniques. A light-to-dark ratio of about 60:1 was still attained even with some substantial (used in terms of optical wavelength) undulations/deformations in the first surface portions.

As an example, protrusion 44, shown on first surface portion 20, is typical of a deformation resulting from a groove or mark in a die part in an injection molding operation. Such a deformation is relatively smooth and will not transmit or refract a substantial amount of light therethrough. That is, a substantial portion of the light impinging upon deformation area 44 may still lie within the above-described tolerances of reflectivity using the internal reflection properties of the material. If deformation 44 had a horizontal component (as viewed in FIG. 2) equal to one wavelength of the light (i.e., in the order of magnitude of 5 microinches, for example), light arriving along said given direction will be transmitted therethrough toward a light detector, such as detector 42. Since these areas are relatively small, the amount of total light transmitted is usually quite small. A threshold in a detector 42 can easily obviate the effects of such light. Accordingly, it is preferred that the internal reflecting surfaces be as smooth as possible in order to enhance the reflectivity thereof, and thereby increase the light-to-dark ratio to the maximum possible extent. It is appreciated, however, that cost factors in designing an optical measuring rule in accordance with the present invention may override such desired performance. Therefore, in low cost applications, first surface portions 20 may have a substantial amount of irregularity and still reflect sufficient light for a successful operation of such an embodiment. It is also permissible to coat the first surface portions for protecting same from environmentally caused changes, for example, scratching. It should be remembered that such coating reduces the optical efficiency of the first surface portions. Such coating does not necessarily destroy such internal reflection properties.

With more particular reference now to FIGS. 3—10 inclusive, several illustrative applications of the invention, as described with respect to FIG. 1, to rotating members are described. It is understood, of course, that rectilinear motion or displacement can be measured as is apparent from inspection of FIG. 1. By appropriately forming the optical graduated rule, other forms of motion and displacement can be accurately measured. For example, hyperbolic and parabolic displacements could be measured. Also, by varying the relative length of the first surface portions 20 and the second surface portions 30 in a graduated rule, address indicia may be provided. That is, a succession of first surface portions may have a length in accordance with a given permutation code to represent a location address. Therefore, not only may the illustrated rule be used for making measurements, but it may also be used simultaneously for indicating a location address of a given measurement. It is to be understood that all of the now-described optical graduated rules, discs, or members consist of transparent material exhibiting internal reflection properties.

Figure 3:
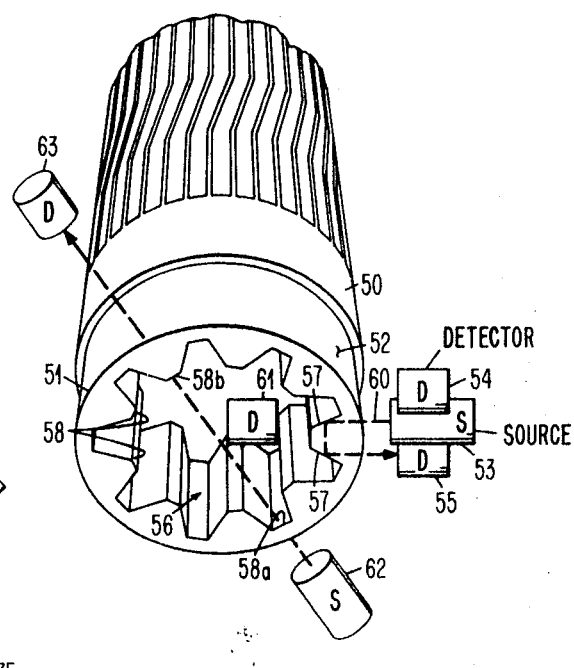
FIG. 3 is a simplified low-angle perspective view of a tubular motor armature on which an annular tachometer disc is mounted utilizing the teachings of the present invention.

With particular reference now to FIG. 3, a tachometer application of the present invention is illustrated. Tubular armature 50 of a motor (not shown) is the rotating member thereof and is used to securely support annular tachometer member 51 at one end thereof. Tachometer member 51, consisting of transparent materials, is inserted inside tubular armature 50 for minimizing the addition of inertia to the armature. The weight of member 51, when made of thermoplastic, is less than a comparable member fabricated from glass. Tachometer member 51 is constructed in accordance with the teachings of the present invention having an annular-shaped light-receiving surface 52 disposed opposite light source 53 and a pair of detectors 54 and 55. Remote surface 56 is formed on the inner annular periphery of member 51 and has a set of first surface portions 57 and a set of second surface portions 58. Light from source 53, represented by dotted line 60, passes through light-receiving surface 52 on a radius of member 51. In accordance therewith, first surface portions 57 are formed to be at 45° with respect to a radius intersecting the midpoint of such first surface portions. Second surface portions 58 are formed concentrically with the light-receiving surface 52. As shown diagrammatically in FIG. 3, light along line 60 is reflected by one of said first surface portions toward another one of said first surface portions then radially outwardly to detector 55, as explained previously with respect to FIG. 1. As member 51 is rotated with respect to light source 53, successive ones of first surface portions 57 reflect light such that detectors 54 and 55 alternately receive reflected light. In the just-described arrangement, it is apparent that both the light source and light detectors are on the outer side of annular member 51 serving as a graduated optical rule for use as a tachometer member. Alternately, light detector 61 may be secured on the inner portion of member 51 for sensing light passing through second surface portions 58. For simplicity, electrical connections to light source 53 and to light detectors 54, 55, and 61 are not shown. The output signals from such light detectors are supplied to suitable analysis and signal processing circuits (not shown) for determining the rotational velocity of tubular armature 50 in a known manner. Of course, the illustrated arrangement may be used to measure angular displacements as well.

Another facile arrangement for a tachometer application is shown in FIG. 3, wherein the disposition of light source 62 and light detector 63 is on a common diameter but on opposite sides of annular graduated rule 51. Light from source 62 passes through light receiving surface 52, thence remote surface second surface portion 58a, through the center space of member 51, thence enters such member through second surface potion 58b and radially outwardly through light-receiving surface 52 to light detector 63. The just-described light path is the second light path. Light detector 63 receives no light from light source 62 whenever light therefrom is reflected by first surface portions 57 into a first light path, returning toward source 62 in the same manner as explained for light source 53. In the just-described arrangement, both light paths ultimately leave graduated rule member 51 from light-receiving surface 52, but on diametrically opposite sides thereof.

Also shown in FIG. 3 is the usage of plural independent optical measurement systems with one graduated rule.

Figure 4:
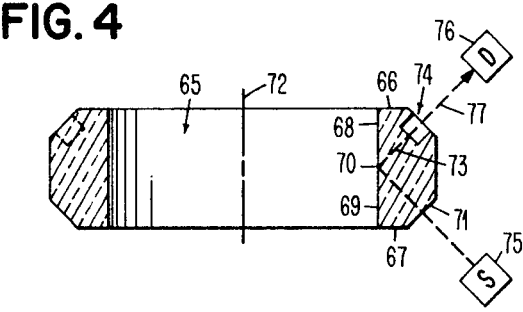
FIG. 4 is a diagrammatic and sectional view of an annular optical graduated rule including a continuous annular surface disposed at 45° with respect to a light-receiving surface for reflecting light such that a remote surface and the light-receiving surface can be disposed on the outer periphery thereof.

In FIG. 4, annular member 65 has a large inner peripheral surface which may be secured to a tubular armature, such as shown in FIG. 3. Alternately, one of the radially extending surfaces 66 or 67 may be secured to a rotating member. In case of a rotating shaft, radial arms may be formed on the shaft attached to the axial ends of the inner surface, such as at 68 or 69 or both. It is desired to keep such attachments away from the center axial portion 70 in order to maintain the internal reflectivity of inner annular surface at 70, as will become apparent. Member 65 has an annular continuous light-receiving surface 71 disposed at 45° with respect to axis of rotation 72. Light is transmitted through the member to be reflected in a given direction by surface portion 70, as indicated by dotted line 73. Inner annular surface portion 70 is a reflection surface such that the given direction of the light approaching remote surface 74 is at right angles to the incident light supplied from source 75. As such, surface portion 70 is "optically intermediate" light-receiving surface 71 and remote surface 74. Remote surface 74 is shaped as illustrated in FIG. 1 and selectively transmits to detector 76 through its respective second surface portions along second light path 77. The fist light path of remote surface 74 retraces the incident light along dotted line 73 and is returned toward source 75. Of course, a pair of detectors may be disposed in juxtaposition to light source 75, such as shown for light detectors 54 and 55 in FIG. 3. The just-described arrangement permits both the detector and the source to be disposed along the outer periphery of transparent member 65.

Figure 5:
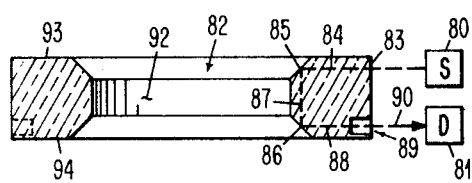
FIG. 5 is a diagrammatic and sectional view of an annular graduated rule of transparent material having a pair of continuous internally reflective inner surfaces arranged to provide a source and detector light path at the outer periphery of the annular member.

FIG. 5 illustrates another version of a graduated rule in which light source 80 and light detector 81 are disposed at the outer periphery of annular optical rule or member 82. Light from source 80 is transmitted along dotted line 84 through light-receiving surface 83 to a first continuous annular internal reflecting surface 85 disposed at 45° with respect to dotted line 84. Light is then transmitted along dotted line 87 axially to second continuous annular internal reflecting surface 86. Surface 86 reflects light from line 87 along a given direction indicated by dotted line 88 to remote surface 89. Second light paths of remote surface 89 are collectively indicated by dotted line 90 and light therein is detected by detector 81. Remote surface 89 is constructed as illustrated in FIG. 1. Both annular internal reflecting surfaces 85 and 86 are optically intermediate light-receiving surface 83 and remote surface 89.

The FIG. 5 illustrated tachometer member may also be used for measuring angular displacement. Light receiving surface 83 and remote surface 89 are on the same outer peripheral surface of member 82. It is somewhat easier to mount the FIG. 5 illustrated member on a shaft than the FIG. 4 illustrated member. A small diameter shaft may be inserted in the inner annulus of member 82 with radial arms or a radial web being disposed and fixedly secured to the inner surface 91 without interfering with the optical properties of member 82. Alternately, member 82 may be mounted on axial end surfaces 93 or 94 without affecting the optical properties of the member with respect to source 80 and detector 81. The first light paths of the member 82 are from remote surface 89 along dotted line 88 to annular reflecting surface 85, then turns the first light path along line 84 back toward source 80.

Figure 6:
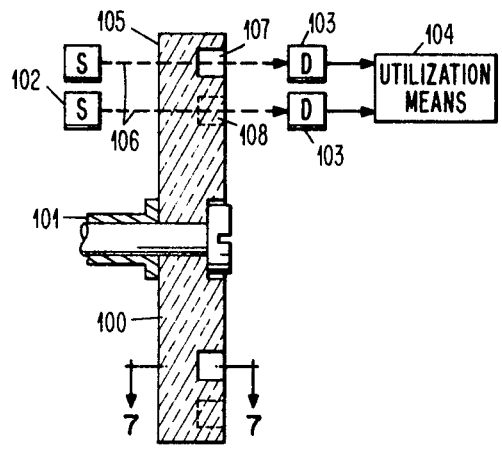
FIG. 6 is a diagrammatic and sectional view of a platelike rotatable graduated optical rule of the see-through type and utilizing the teachings of the present invention. Plural light paths are provided for plural graduated rules.
Figure 7:
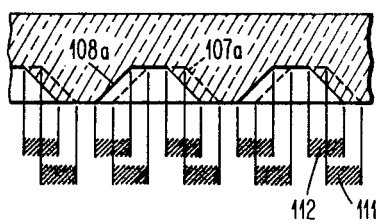
FIG. 7 is an enlarged partial-sectional view taken in the direction of the arrows along line 7–7 in FIG. 6 and illustrates the phase displaced relationship of two graduated rules.

Referring next to FIG. 6 and 7, a platelike or disc-shaped rotatable member 100 is shown providing two-phase optical signals. Member or disc 100 is fixedly secured to rotating shaft 101 for rotation therewith. The illustrated disc is used as a see-through type but, as explained above, may be used as a reflective type. A pair of light sources 102 are disposed at the outer periphery of disc 100 on one axial side thereof with a corresponding pair of light detectors 103 disposed on the opposite axial side thereof for receiving light selectively through disc 100. Utilization means 104 receives the two-phase signal in electrical form from detectors 103. Disc 100 has light receiving surface 105 for transmitting light therethrough along dotted lines 106 in a given direction. A pair of remote surfaces 107 and 108 are formed concentrically about shaft 101 at the outer periphery of disc 100. Each remote surface 107 and 108 has the above-described first and second surface portions, respectively, for causing light to be transmitted along the first and second light paths. In the illustration of FIG. 6, the second light paths of the respective remote surfaces are directed to detectors 103. As best seen in FIG. 7, remote surfaces 107 and 108 are phase displaced in order to provide two-phase output signals. In FIG. 7, remote surface 107 is indicated by dotted line 107a, while remote surface 108 is represented diagrammatically by solid line 108a. The dark areas (i.e., opaque areas in which the first light paths are formed by the respective remote surface portions) are represented, respectively, by hatched areas 111 and 112. The transparent areas therebetween respectively represent the second light paths of remote surfaces 107 and 108.

It is seen that the light paths of the two remote surfaces are staggered to form phase displaced light signals from disc 100, as will be better understood by referring back to FIG. 1. The phase displacement is 90°, which means that the corners of one set of remote surfaces are at the midpoint of the planar surfaces of the other remote surface. In FIG. 1, a 360° phase displacement of member 10 is represented by movement in either direction of the member from a midpoint of a second surface portion 30, as indicated by the zero degree line 115. This, of course, corresponds to a 360° phase movement in the opposite direction. A 90° movement of member 10 is represented by the 90° marker 116, which occurs at a corner 117. At the midpoint of a first surface portion 20 is the 180° line 118. The 270° occurs at corner 119, and a complete cycle between light and dark is completed at the 360° point, which is the midpoint 12 of second surface portion 30. In the FIG. 7 illustrated embodiment, remote surface 107 can be considered to be the one illustrated in FIG. 1. Remote surface 108 has its corners between adjacent first and second surface portions at lines 115, 118, and 120 to provide the 90° phase difference in light and dark at the two remote surfaces. The utilization of a two-phase tachometer disc or displacement measuring device is quite well known.

Alternately, it may be desired to have only one set of remote surfaces extending completely around disc 100. The second set of remote surfaces may have only one pair of first surface portions 20 to form a fiducial mark (i.e., a reference point on the rotation of disc 100). In this instance, the fiducial mark could be a pair of first surface portions with a short second surface portion therebetween and bracketed by a second surface portion extending around the periphery of disc 100. The fiducial mark would be represented in a see-through tachometer disc by an opaque area or dark area followed by a short light area which, in turn, is followed by a dark area.

Figure 8:
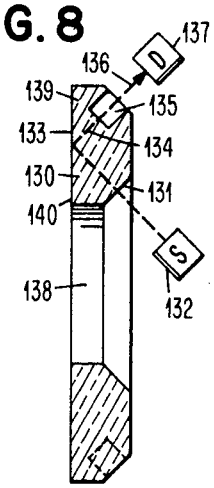
FIG. 8 is a diagrammatic and sectional view of an annular graduated rule having plural surfaces for reflecting light along a 90° path for enabling a light source and light detector to be disposed on the same axial side of the member.
Figure 9:
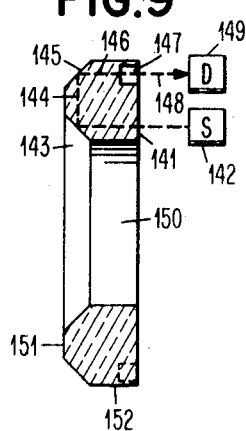
FIG. 9 is a diagrammatic and sectional view of an annular optical graduated rule using the teachings of FIG. 5 but having a different axis of rotation such that the light source and detector are on one axial side of the member rather than being disposed radially outwardly of the member as in FIG. 5.

FIGS. 8 and 9 are modifications, respectively, of FIGS. 4 and 5. The axes of rotation of the members, shown in FIGS. 8 and 9, are at 90° with respect to the axes of rotation in FIGS. 4 and 5. In member 130 (FIG. 8), light-receiving surface 131 receives light from source 132. Single continuous annular internal reflecting surface 133 reflects the light received from source 132 in a given direction indicated by dotted line 134. Remote surface 135 has first and second surface portions, as above described, for providing a second light path 136 to detector 137. The first light path is along line 134, thence surface 133, back through light-receiving surface 131 toward source 132. The just-described member may be mounted for rotation by affixing the member at its inner annular surface 138 to a rotating shaft, a tubular member, or any other rotating member. If member 130 is to be attached on its radial surface 133, such attachment should be either on the outer radial portion, as at 139, or on the inner radial portion, as at 140, in order to avoid making the attachment in the area of reflection of light from source 132.

In FIG. 9, there is a modification of the FIG. 5 member in which the light-receiving surface 141 passes light from source 142 to a first continuous annular reflecting surface 143. Light is transmitted radially outwardly along dotted line 144 to second annular continuous reflecting surface 145. Light is then transmitted along a given direction, indicated by line 146, to remote surface 147. Second light path 148 carries light to light detector 149. The first light path (i.e., the light reflected by first surface portions of remote surface 147) can be traced back to source 142 as described for the member 82 in FIG. 5. Support of the illustrated FIG. 9 member on a rotatable shaft can be by attachment to inner annular surface 150 without affecting the optical properties of the member. Alternately, annular axially facing member 151 may be used to affix the FIG. 9 illustrated member to a tubular shaft or armature. It may also be affixed to a disc without affecting the optical properties or operation of the annular graduated rule. Alternately, the member may be affixed on an outer facing surface 152; for example, inside a tubular armature 50, as shown in FIG. 3.

Figure 10:
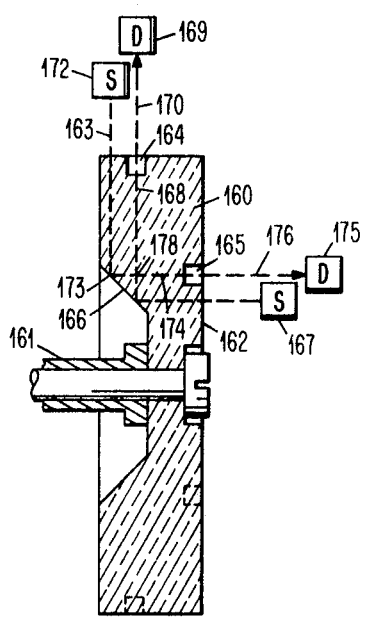
FIG. 10 is a diagrammatic cross-sectional view of a platelike circular disc having two independent light paths each with light receiving and remote surfaces while using the same reflective surface inside the member.

Referring next to FIG. 10, the versatility of possible combinations and variations in the implementation of the present invention is briefly further shown wherein disc-type member 160 is utilized to provide two independent optical paths which cross and utilize a single-annular reflecting surface for effecting such configuration. Disc 160 is fixedly secured to rotating shaft 161 for rotation therewith. It has a pair of light receiving surfaces 162 and 163, respectively, on a radially extending surface and on a circumferentially extending surface. A pair of corresponding remote surfaces 164 and 165 are formed by molding respectively on a circumferential surface and a radially extending surface. A single-annular reflective surface 166 extends concentric to the axis of rotation of shaft 161. Source 167 supplies light through light-receiving surface 162, which is reflected by reflecting surface 166 in a given direction indicated by dotted line 168 toward remote surface 164. Detector 169 detects light transmitted along second path 170 from remote surface 164. This is one optical system in disc 160. A second system is provided from source 172 through light-receiving surface 163; thence is reflected by surface 166, as at 173, along a given direction indicated by dotted line 174 toward remote surface 165. Detector 175 detects light transmitted along second path 176 from remote surface 165. The two systems are independent. It should be noted that the light paths cross at 90°, as at 178. Remote surfaces 164 and 165 are shaped as shown in FIG. 1. Light sources 167 and 172 and detectors 175 and 169 are disposed outwardly of member 160 adjacent circumferential and radial surfaces, respectively. The light source and detector of each optical measuring system is still disposed generally on the same sides of member 160, which facilitates good mechanical design. From inspection of FIGS. 3—10, it can be seen that the location of the detectors and light sources and the type of light path to be provided with the graduated rule of transparent material utilizing the configuration illustrated in FIG. 1 is practically unlimited.

Figure 11:
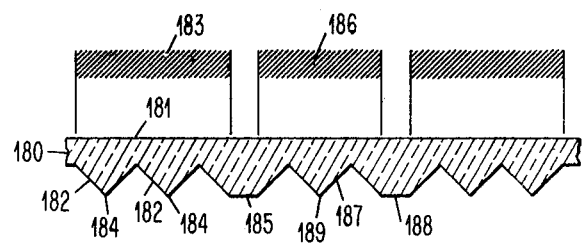
FIG. 11 is a partial diagrammatic sectional view of an optical graduated scale utilizing the teachings of the present invention and showing certain variations of reflective and light transmissive areas.

Yet other variations are shown in FIG. 11, which the same type of diagrammatic illustration as FIG. 1. A member of transparent material exhibiting internal reflection properties has light-receiving surface 181. A first set of first surface portions 182 from a continuous dark area indicated by hatching 183. The continuous dark area extends over the plurality of first surface portions 182. A salient difference between the first surface portions 182 and the first surface portions 20 of FIG. 1 is that portions 182 are constituted by a series of continuous 45° surfaces. The rather sharp corners 184 between adjacent ones of said surface portions 182 provide a minimum of light to go therethrough. As explained previously, in a molded member, corners cannot be made perfectly sharp. Each corner 184 has a finite radius as explained with respect to FIG. 2. By setting a threshold level in a light detector, the effect of such sharp corners can be minimized or completely eliminated. Of course, any member described herein may be fabricated by means other than molding to provide abrupt corners. First surface portions 182 are adjacent a short second surface portion 185. Adjacent second surface portion 185 is a second set of first surface portions 187 providing dark area 186. First surface portions 187 form two complete undulations. Adjacent first surface portions 187 is another second surface portion 188, which is coplanar with the first-mentioned second surface portion 185. This is in contradistinction to the successively occurring second surface portions 30 illustrated in FIG. 1, wherein successive ones are in parallel displaced planes. To make the adjacent ones of said second surface portions coplanar, all that is required is that an odd number of outwardly facing corners 189 be formed between adjacent first surface portions. If an even number of corners, such as corners 184, are formed, then adjacent second surface portions will be parallel but in physically displaced planes. In any event, there is provided means for making light and dark areas on either side of optical rule 180 which minimizes the thickness thereof by providing a plurality of 45° oriented undulations with respect to a light receiving surface 181. With this latest description, it should be apparent to those skilled in the art that many more variations may be provided in the successful practice of the just-described invention.

Figure 12:
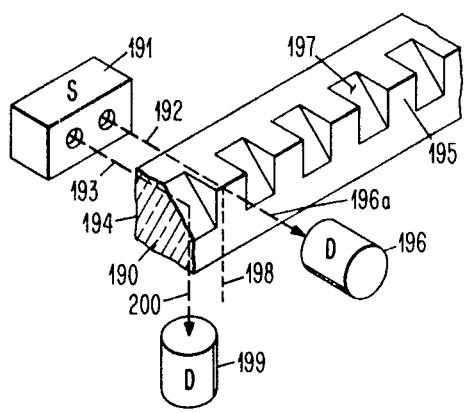
FIG. 12 is a partial diagrammatic showing of another embodiment in which the first and second surface portions of the remote surfaces are coplanar, respectively.

Another embodiment of the invention is illustrated in FIG. 12 in which the first light paths associated with the first surface portions do not intersect the light-receiving surface. Additionally, the first and second light paths of optical graduated rule 190 leave the rule at right angles with respect to each other. This facilitates the positioning of two detectors 196 and 199, respectively, in the two light paths. Both light detectors 196 and 199 operate at the same frequency since the first and second light paths contain the same frequency of light variations as opposed to the configuration previously described with respect to the first light paths of the FIG. 1 and FIGS. 3—10 illustrated embodiments.

A pair of light sources 191 emit light, respectively, along paths 192 and 193 toward optical graduated rule 190. Light traveling along path 192 enters optical graduated rule 190 through light-receiving surface 194 and thence is passed through the rule toward its remote surface consisting of first surface portions 197 and second surface portions 195. When a second surface portion 195 is aligned with light path 192, light is transmitted therethrough to light detector 196. Relative movement of rule 190 with respect to light path 192 may align a first surface portion 197 therewith. Light from path 192 then reaches first surface portion 197 after traveling inside rule 190 to be reflected into a first light path 198, which is at right angles to the second light path 196a. Accordingly, it is seen, as rule 190 moves relative to light path 192, detector 196 will alternately receive light and not receive light in accordance with the displacement of rule 190.

Light traveling along path 193 is shown as impinging on first surface portion 197 after having traveled inside rule 190 to be reflected along a first light path 200 to light detector 199. Again, as rule 190 is moved relative to path 193, light traveling along path 193 may be aligned with a second surface portion 195 to thereby permit light to travel therethrough and not be reflected toward detector 199. Accordingly, detector 199 will alternately receive light and not receive light from light path 193 in accordance with the displacement of rule 190.

All first surface portions 197 are aligned in the same plane and face in the same direction, thereby to reflect light along first light paths parallel to the light receiving surface 194. Member 190 may be made rectilinear, as illustrated in FIG. 12, or it may be constructed as an annular member, as illustrated for the embodiments of FIGS. 3—10.

All of the illustrated embodiments have shown first surface portions disposed at a given 45° angle with respect to the given direction of light travel within the optical rule, and second surface portions at other than the given 45° to permit light to leave the rule through such second surface portions. Included in the scope of the present invention are second surface portions disposed at right angles to the first surface portions. In the latter arrangement, light arriving at the remote surface within the graduated rule is internally reflected in first light paths by the first surface portions extending in a first direction within the rule while light reflected by the second surface portions moves in a direction opposite to the first direction such that light traveling along the paths leaves the optical rule at divergent locations to provide optical measuring properties.

While the invention has been particularly shown and described with reference to preferred embodiments thereof, it will be understood by those skilled in the art that various changes in form and details may be made therein without departing from the spirit and scope of the invention.

What I claim is:

1. For a measurement device, a graduated optical member consisting of transparent material with internal reflection properties having a light-receiving surface and a remote surface,
    said member being capable of transmitting light from said light-receiving surface toward said remote surface such that said light approaches said remote surface in a given direction within said member,
    said remote surface having a set of first planar surface portions each disposed substantially at 45° with respect to said given direction for reflecting in accordance with said internal reflection properties substantially all light arriving along said given direction to first light paths, respectively substantially at right angles to said given direction, and said first light paths leaving said member at given locations thereon,
    said remote surface also having a set of second surface portions each disposed at substantially other than said given 45° for permitting light arriving along said given direction to follow respective second light paths, each said second light path leaving said transparent member at locations other than said given locations,
    said portions being alternated on said remote surface such that said transparent member has alternating effectively opaque and light-transmitting portions on said first and second light paths as indicia of displacement, and
    a corner joining each adjacent ones of said portions for improving optical demarcation therebetween.

2. The member set forth in claim 1, wherein said set of first surface portions is arranged in plural pairs of such surface portions facing each other inside said member such that said first light path of either one of said facing surface portions has a first portion disposed at right angles to said given direction and extending between said facing first surface portions such that light therein is reflected by another one of said facing surfaces into a second portion of said first light path extending parallel to said given direction but with light going in an opposite direction.

3. The member of claim 2, herein said member is tubular shaped with inner and outer tubular walls, one of said surfaces being said outer wall and another of said surfaces being said inner wall.

4. The member of claim 3, wherein said first surface portions are all flat plane, smooth surfaces, said remote surface having a general annular configuration, and said light-receiving surface being a smooth annular surface.

5. The member of claim 2, wherein said member is a unitary member having an annular portion in which said surfaces reside and with a central axis about which said surfaces are concentrically disposed with said light-receiving surface having an annular shape.

6. The member of claim 5, wherein said member is platelike with said annular portion being a periphery of said member and all said surfaces are on the same axial side of said platelike member, and, further including an annular surface on said member disposed at 45° with respect to said light-receiving surface for reflecting light transmitted thereto inside said member from said light-receiving surface such that said first direction extends outwardly of said member on the same axial side of said member as said light receiving member is disposed.

7. The member of claim 5, further including annular internal reflecting surface means in said annular portion optically intermediate said light receiving and remote surfaces for internally reflecting light therebetween in said given direction and along said first light path,
said member having first and second oppositely facing sides and said annular internal reflecting surface means being included in said first side and said light receiving and remote surfaces being included in said second side, such that said first and second light paths have portions outside said member along said second side.

8. The member of claim 7, further including second light receiving and second remote surfaces, said annular internal reflecting means also being optically intermediate said second light receiving and second remote surfaces for internally reflecting light therebetween in a second given direction and along a second one of first light paths, said second one of first light paths crossing the first-mentioned first light path.

9. The member of claim 1 having plural measurement sets of said light receiving and remote surfaces, each said measurement set having its respective first set of surface portions phase translated with respect to every other first set of surface portions.

10. The member of claim 1, wherein said first and second surface portions, respectively, are coplanar flat surfaces.

11. An optical system for making measurements of rotational movements including,
a light source for emitting light,
a unitary rotatable member for receiving said light and consisting of molded transparent material exhibiting internal reflection properties and capable of transmitting said light,
plural planar surfaces disposed in an annulus on said member for directing light from said source impinging thereon from inside said member,
a first set of said planar surfaces disposed in spaced relation circumferentially on said member and at 45° with respect to said impinging light within said member for directing same along a first light path,
a second set of said planar surfaces on said member for causing said impinging light within said member to follow a second light path and being intermediate said planar surfaces in said first set such that circumferentially along said annulus there are alternate planar surfaces of said first and second sets for providing first and second light paths which alternately receive and don't receive light as said member is rotated, light in said first and second light paths leaving said member at spaced apart locations on said member, and
detector means operatively positioned with respect to one of said light paths to receive light therefrom originating at said source and responsive to such received light to generate electrical signals indicative of rotational movement of said member.

12. The system of claim 11, wherein said unitary member has an annular shape with said light receiving surface being an outer circumferential surface thereof and said remote surface being an annular inner circumferential surface thereof, and
said light source and said detector means being on a common diameter of said member radially outwardly of said light-receiving surface such that said second light path extends along said common diameter intersecting said member adjacent said detector means.

13. The system of claim 11, wherein said unitary member has an annular internal reflecting surface optically interposed between said light receiving and said remote surfaces such that both said first and second light paths include portions outside said unitary member generally on the same side thereof.

14. An optical graduated rule including transparent material exhibiting internal reflection properties,
pairs of first planar surface means disposed at right angles with with respect to each other and at 45° with respect to a given direction along which light may be transmitted and being capable of reflecting light through first light paths,
second planar surface means respectively interposed between adjacent ones of said first planar surface means such that said means together constitute a continuous rule along a first direction of alternate first and second planar surface means,
said second planar surface means being capable of transmitting light therethrough in a second light path,
said first light path folding back upon itself generally in a U-shaped configuration, and
both said first and second light paths including a portion in said transparent material and portions outside said transparent material, said outside portions of said first and second light paths being displaced from the other along said first direction.

15. An optical graduated rule consisting of transparent material,
the improvement including the combination,
a planar light-receiving surface,
a remote surface having a first planar surface portion disposed at 45° to light entering said rule through said receiving surface,
a second surface portion of said remote surface disposed substantially at other than said 45° for transmitting light therethrough from said receiving surface, and
a rounded corner joining said portions such that light from said receiving surface is refracted to make the corner appear optically more abrupt than the geometry of the corner.